United States Patent
Inagaki

[15] 3,692,380
[45] Sept. 19, 1972

[54] METHOD AND APPARATUS FOR PRODUCING HOLOGRAMS UTILIZING A PLURALITY OF SHORT FOCUS CONVEX LENSES

[72] Inventor: Takefumi Inagaki, Yokohama-shi, Japan

[73] Assignee: Fujitsu Limited, Kawasaki, Japan

[22] Filed: Feb. 1, 1971

[21] Appl. No.: 111,537

[30] Foreign Application Priority Data

Feb. 10, 1970    Japan .................45/11765

[52] U.S. Cl. ............................................350/3.5
[51] Int. Cl. .............................................G02b 27/22
[58] Field of Search .........................350/3.5

[56] References Cited

UNITED STATES PATENTS 3,572,878   3/1971   Lu ..............................350/3.5
3,515,452   6/1970   Pole ...........................350/3.5

Primary Examiner—David Schonberg
Assistant Examiner—Robert L. Sherman
Attorney—Curt M. Avery, Arthur E. Wilfond, Herbert L. Lerner and Daniel J. Tick

[57] ABSTRACT

A plurality of short focus convex lenses are irradiated with a coherent beam of light. The coherent beam of light is diffused by the lenses and the diffused light is directed to a storage plate. The storage plate is irradiated with a reference beam of light in a manner whereby the reference beam of light interferes with the diffused beam of light.

7 Claims, 6 Drawing Figures

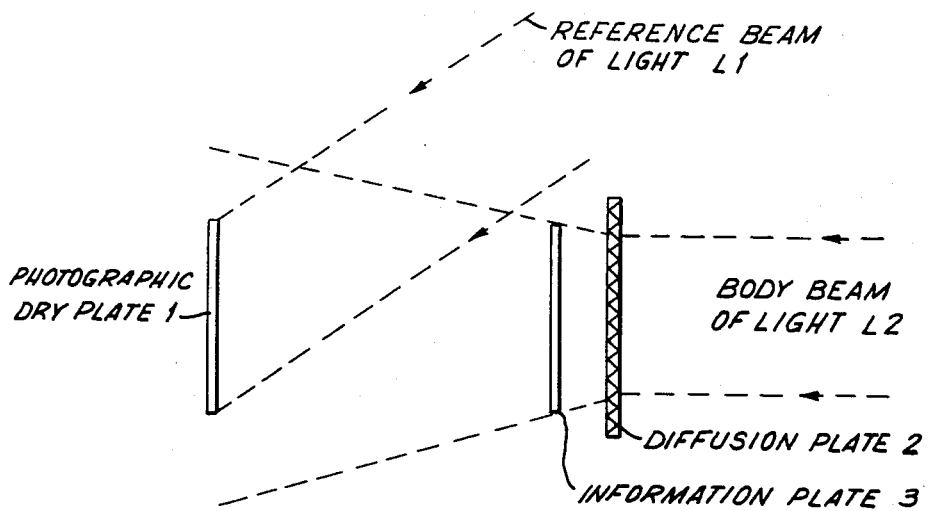
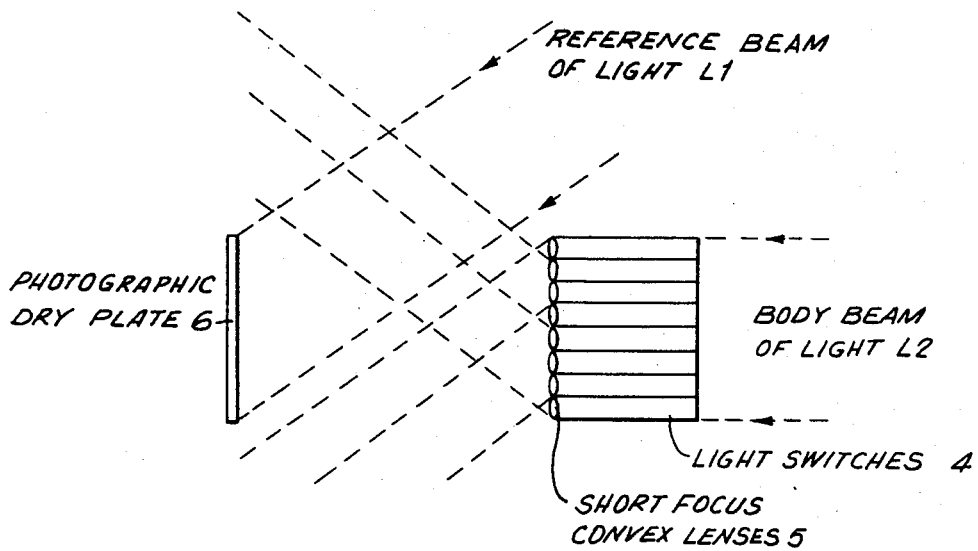

FIG. 3
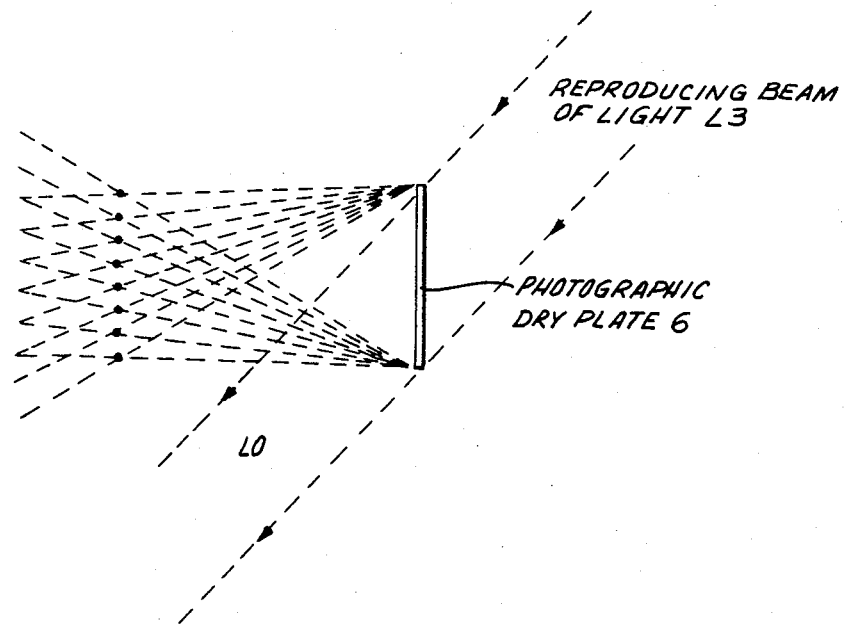
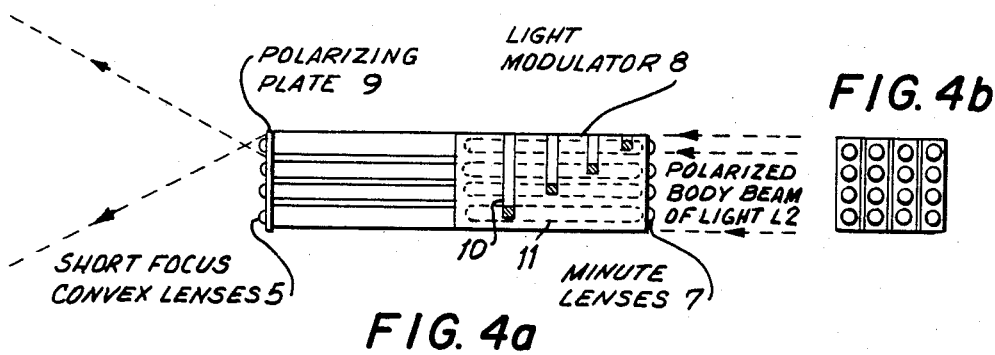
FIG. 4a    FIG. 4b

METHOD AND APPARATUS FOR PRODUCING HOLOGRAMS UTILIZING A PLURALITY OF SHORT FOCUS CONVEX LENSES

DESCRIPTION OF THE INVENTION

My invention relates to a method and apparatus for producing holograms.

Holography is a two-step photographic method. First, a coherent reference beam of light is irradiated onto a signal beam of light (object beam) coming or reflected from a body, and the interference fringe is recorded on a storage plate, such as a photographic dry plate, or the like. A hologram is produced by photographically developing the interference fringe. Like the reference beam, the body or object beam is coherent and preferably monochromatic. For that reason, the body beam can be readily produced by splitting a laser reference beam, as is generally known, for example from Scientific American Vol. 219, No. 3, p. 153-155. From the hologram thus produced, the object is reconstructed optically by illuminating the hologram plate with the reference beam only. This produces replicas of the wave fronts as originally reflected from the object. A real image and a virtual image of the object are thus produced by the image forming action of the hologram.

A hologram is called a Fourier transformation hologram when the distance between the hologram and the body (object) is infinite, and is called a Fresnel hologram when the distance between hologram and body is finite. A Fourier transformation hologram may be produced when performing the photography by positioning the body and the hologram on the prefours and postfours faces, respectively, of a convex lens. The use of the lens permits information of parts of the body to reach the entire surface of the hologram, so that the entire body may be reproduced from any small part of the hologram. In other words, a Fourier transformation hologram has redundancy.

On the other hand, a Fresnel hologram of a body having no diffusing characteristic and which is translucent or through which light may penetrate, has no redundancy, and a diffusion plate must be utilized if the hologram is to have redundancy. This is disclosed, for example, in U.S. Pat. No. 3,506,327 and will be explained presently with reference to FIG. 1 of the drawings appertaining to the present disclosure.

In the construction of a Fresnel hologram, ordinarily, a coherent beam of light $L_1$ (reference beam) and a coherent beam of light $L_2$ (body beam or object beam) are used and the light interference fringes are recorded on a photographic dry plate 1. Denoted by 2 is a diffusion plate, and 3 is an information plate through which light can penetrate. An example of the information plate through which light can penetrate is an information plate on which transparent and opaque code bits are written. Where light can penetrate, the zero-order light which penetrates through the plate 3 is stronger than the higher-order diffracted light generated by the penetrating of the light through the plate so that, in general, the hologram constructed by the use of reference beam $L_1$ has no redundancy and cannot be put to practical use, and a high-density recording cannot be realized. This can be prevented by providing a diffusion plate 2 of ground glass or the like in front of plate 3 and irradiating the diffused light onto the body and thus causing the hologram to have redundancy.

However, the use of diffusion plate 2 and the irradiation of the diffused light on the body 3 result in the following defects.

First, the efficiency of the body beam used in the production of the hologram is considerably reduced by the passage of light through the diffusion plate 2. The intensity of the light is also considerably reduced by the passage of the diffused light through the amplitude penetration type information plate 3. Secondly, it is difficult to exchange information or data at high speed. If the size of the hologram is gradually reduced, the diffusion plate 2 also appears as the background of the image information in the reconstruction of the image, and the signal to noise ratio is considerably decreased.

It is an object of my invention, therefore, to provide a new and improved method and apparatus for producing holograms which avoid the defects of those made by the known methods and apparatus.

Another object of the invention, more specifically, is to produce a hologram of a body which is transparent and which has redundancy, without the use of a diffusion plate.

It is further an object of the invention to produce a hologram where nothing other than the information or data appears as the background of the image information in the reproduction of the image, and even minute point information may also be reproduced with a very high signal to noise ratio.

Another object of my invention is to provide a method and apparatus for producing a hologram wherein image information or data may be exchanged at high speed.

To achieve the foregoing objects, and in accordance with a feature of my invention, I diffuse a coherent beam of light through a plurality of short focus convex lenses, causing all of the diffused light to reach a storage plate positioned behind the convex lenses, and I simultaneously irradiate the storage plate with a reference beam of light, constituting the image information with the ratio of strengths of a coherent beam of light passing through the convex lenses and thereby producing a hologram.

The hologram producing apparatus of the invention comprises devices for forming a coherent body beam of light and a reference beam of light. An information source comprises a plurality of planarly positioned short focus convex lenses. A plurality of light switches provided in front of the information source control the coherent beams of light irradiated onto the plurality of short focus convex lenses. The state of the light switches, controlled by a controller, constitutes the image information. A storage plate behind the information source is located in a position where it receives the diffused light from all of the convex lenses.

In accordance with my invention, a method of producing holograms with a plurality of short focus convex lenses constituting an information source and a storage plate, comprises the steps of irradiating the plurality of short focus convex lenses with a coherent beam of light, diffusing the coherent beam of light by the convex lenses, directing the diffused light to the storage plate, and irradiating the storage plate with a reference beam of light in a manner whereby the reference beam of light interferes with the diffused beam of light.

The image information of the information source is constituted by the intensity ratio of the coherent beams of light passing through the convex lenses and may be varied by controlling the magnitude of light irradiating the convex lenses.

In accordance with the invention, apparatus for producing holograms comprises light means for providing a coherent body beam of light and a reference beam of light. An information source comprises a plurality of coplanarly positioned short convex lenses for diffusing the coherent beam of light. A plurality of light switches in front of the convex lenses control the coherent beam of light irradiating the convex lenses. Control means affect the operation of the light switches to constitute the image information. A storage plate is behind the information source at a position in which it receives the diffused light from all the convex lenses.

The storage plate may comprise a photographic dry plate or a storage medium on which holograms may be produced and from which holograms may be erased.

The light means comprises a laser source for providing a polarized coherent beam of light. A polarizing plate is positioned in front of the convex lenses.

In order that the invention may be readily carried into effect, it will now be described with reference to the accompanying drawings, wherein:

FIG. 1, already described, is a schematic diagram illustrating a method of producing conventional Fresnel holograms;

FIG. 2 is a schematic diagram illustrating an embodiment of the method and apparatus of the invention for producing holograms;

FIG. 3 is a schematic diagram illustrating a method for reconstructing holograms produced by the method and apparatus of FIG. 2;

FIGS. 4a and 4b are schematic diagrams illustrating an embodiment of a high speed information display plate of the type utilized in the method and apparatus of FIG. 2.

Figure 5:
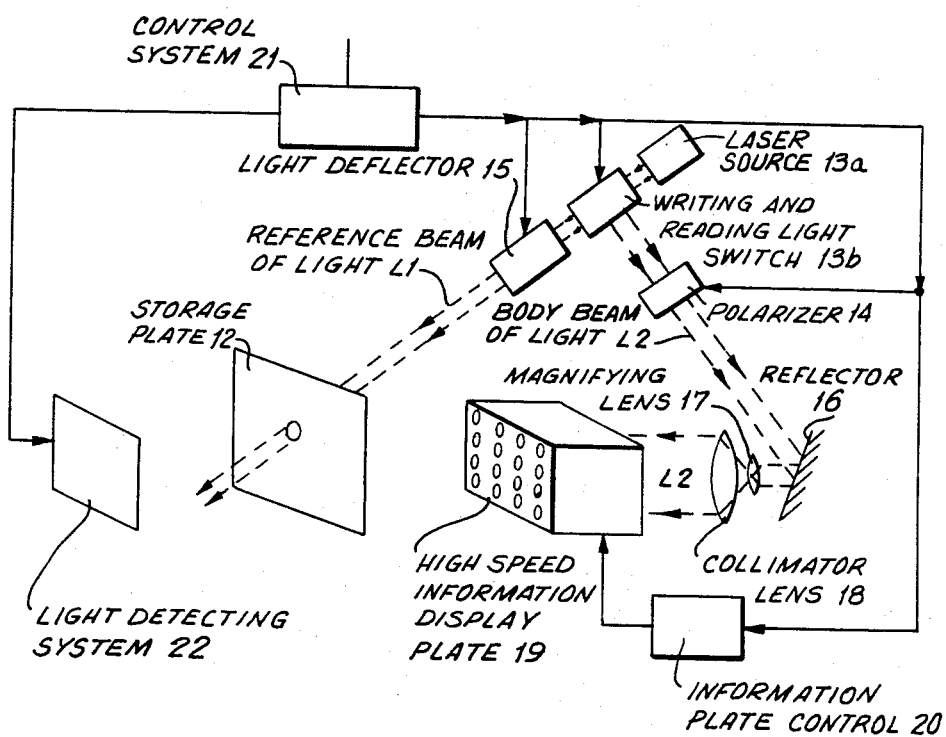
FIG. 5 is a schematic circuit block diagram of an embodiment of apparatus constituting a rewritable holographic memory utilizing the high speed information display plate illustrated in FIGS. 4a and 4b.

As explained above, a Fresnel hologram produced by the method of FIG. 1, using only the reference beam L1, has no redundancy. The hologram is of little, if any, practical utility; a high density recording cannot be obtained.

The difficulties, however, may be prevented by utilizing the diffusion plate 2, such as a pane of ground glass, or the like. The diffusion plate 2 is positioned in front of the information plate 3 and irradiates the diffused light onto the plate 3 so that the resulting hologram is redundant.

The utilization of the diffusion plate 2 creates various defects as hereinbefore described. These defects are overcome by the method and apparatus of the invention.

In the known method, image information or data of a transparent information plate or body is diffused on the entire surface of the hologram by utilizing a diffusion plate or by positioning a convex lens between the information plate and the hologram. In my invention, an image information is in itself a diffused light, so that there is no need for a diffusion plate or a convex lens for effecting a Fourier transformation. The diffusion plate or convex lens is therefore eliminated in the method and apparatus of the invention.

Image transformation in the method and apparatus of the invention is a coherent diffused light generated by a plurality of point sources of light and passing through a plurality of short focus convex lenses. The information recorded on the hologram is constituted by the ratio of strengths of the coherent beam of light from the point sources of light. That is, the information or data is constituted by the presence or absence of a coherent beam of light passing through the short focus convex lenses or by the ratio of strengths of beams of light which may be detected in the reconstruction.

A coherent beam of light from a laser source is generally utilized. The laser beam is directed to a plurality of short focus convex lenses as a body beam of light L1 and is diffused by the convex lenses. All the diffused light of the coherent beam of light which passes through the convex lenses reaches a hologram. That is, all the diffused light of the coherent beam of light which passes through the convex lenses reaches a storage or information memory plate positioned behind said convex lenses. The focal distance of the convex lenses is so short that the diffused light which passes through said lenses reaches the entire surface of the hologram.

Simultaneously with the arrival of the diffused light from the body beam of light at the storage or information memory plate, said storage plate is irradiated by the coherent beam of light from the laser source as the reference beam of light, thereby producing the hologram. In accordance with the invention, the information to be stored is constituted by the ratio of strengths of the coherent beam of light passing through the short focus convex lenses. In an embodiment of the invention, therefore, a plurality of short focus convex lenses are coplanarly positioned to constitute an information source. A plurality of light switches vary the coherent beam of light irradiated on the convex lenses under the control of a control unit or system.

The light switches are positioned in front of the information source. That is, the light switches are located on the side of the information source closer to the light source. Each of the light switches is aligned with a corresponding one of the convex lenses. Each of the light switches may comprise an electro-optical crystal which is electrically controlled by a signal from the control unit or system, so that informations or data may be exchanged at high speed, and the hologram producing apparatus of the invention may be advantageously utilized with an information processing system. It is advantageous that the storage plate be a medium for a rewritable type holographic memory, so that recorded information in the information processing system may be exchanged.

The hologram produced by the method and apparatus of the invention is reconstructed by light whose wavelength is the same as, or different from, that of the laser beam used in the photographic process. A simple manner of reconstructing the hologram is to irradiate the hologram with the reference beam of light used in the photographic process from the same direction. The reproduced image face is provided behind the hologram and is provided at a position symmetrical to the foci of the convex lenses of the information source with respect to the hologram. The reproduced image face is reproduced as a strong spot, which is very suitable for the representation of binary data.

Obviously, the image of the diffusion plate does not appear in the reproduced face. A light detecting system, for example an integrated circuit comprising a silicon substrate and photodiodes or phototransistors assembled in the silicon substrate, is provided at the reproduced image face to detect the strong spot. When the hologram is recorded by the strength of the coherent beam of light passing through the convex lenses, binary signals may be detected or discriminated by providing a threshold level in the detecting signals of the light detecting system.

Although light switches have been described herein for switching the image informations at high speed, a suitable screening device for controlling the quantity of the coherent beam of light which passes through the convex lenses may be positioned before or after the convex lenses may be positioned before or after the convex lenses of the information source, when such high speed switching is unnecessary.

In the embodiment of FIG. 2, the collimated body beam of light L2 comprises a coherent beam of light, and the reference light L1 comprises a coherent beam. The beams L1 and L2 are irradiated from laser sources such as, for example, helium-neon lasers.

In the embodiment of FIG. 2, a plurality of light switches 4 are provided in the path of the body beam L2. A plurality of short focus convex lenses are coplanarly positioned in the path of the body beam L2 after the light switches 4. Each of the convex lenses 5 is positioned adjacent a corresponding one of the light switches 4. Short-focus convex lenses are utilized instead of the transparent information plate 3 and diffusion plate 2 of the known apparatus of FIG. 1.

The body beam of light L2 passes through the light switches 4 and thence through the short-focus convex lenses 5. The body beam of light L2 is then irradiated on the recording or storage surface of a photographic dry plate or storage plate 6. The coherent beam of light which has passed through the convex lenses 5 is once focused at the foci of said convex lenses and is then expanded on the surface of the hologram or photographic dry plate 6. For this reason, as hereinbefore described, the reference beam of light L1 may comprise collimated parallel plane waves or a beam of light substantially the same as such waves.

When the body beam of light L2 coincides with the short focus convex lens group 5, light foci of a number equal to the number of said lenses are produced at the positions spaced from the lenses a focal distance $f$. The body beam of light L2 is once focused on the foci of the convex lenses 5 and is then projected on the surface of the photographic dry plate 6 and simultaneously interferes with the reference beam of light L1 on the dry plate. Thus a hologram is produced on the surface of the dry plate 6. When the light switches 4 are not used, the coherent beam L2 passing through the short focus convex lenses 5 must be interrupted in accordance with the information to be communicated.

The aforedescribed method of reconstruction of a hologram is illustrated in FIG. 3. When a reproducing beam of light L3 is projected on the storage plate, photographic dry plate or hologram 6, zero-order light LO is produced behind the hologram in the direction of the reproducing beam of light. The reproduced image face is constituted by the foci of the convex lenses. This method is therefore advantageous in the representation of binary information.

Obviously, the image of the diffusion plate does not appear at the reproduced face. Therefore, a light detecting system is provided at the reproduced image face when the aforedescribed method is applied to a holographic memory device.

In the known method, the transparent information plate 3 (FIG. 1) must always be changed. In the method of the invention, however, as illustrated in FIG. 2, sets of image information may be exchanged automatically by utilization of the short focus convex lenses 5 and the group of light switches 4. The automatic exchange of image information or data is accomplished by a control signal from an external information system such as, for example, a data processing system computer.

FIGS. 4a and 4b illustrate the details of the group of short focus convex lenses 5 and the group of light switches 4. FIG. 4b is an end view of the device illustrated in FIG. 4a. In FIG. 4a, part of the polarized body beam of light L2 is focused by a plurality of minute lenses 7 and the path of the beam of light is limited. The light passes through a 100 percent light modulator 8, for example an electro-optical crystal such as lithium tantalate, and reaches a polarizing plate 9.

The quantity of light passing through the polarizing plate 9 is determined by whether the light is modulated zero percent or 100 percent by the modulator 8, and a light output of 0.1, or half tone, can be obtained. The light which has passed through the polarizing plate 9 is automatically focused by the short focus convex lenses 5 and is then expanded.

The light modulator 8 comprises two layer bodies each comprising a desired number of thin plates of an electro-optical crystal provided in the direction of the thickness of the thin plates and spaced from each other. The two layer bodies are mutually orthogonal. That is, the thin plates of one layer body are shifted 90° from the thin plates of the other layer body. This arrangement is well known for temperature compensation.

Each of the thin plates is provided with metal electrodes 10 and 11 on both surfaces. The metal electrodes 10 and 11 are mutually perpendicular. In FIG. 4a, the areas of intersection of the electrodes are illustrated by hatching. The application of an operating voltage to the electrodes of the thin plates causes the rotation of the plane of polarization of light at the areas of intersection.

Assuming that the thickness of the thin plate of an electro-optical crystal is equal to the thickness of the electrode, the voltage required to rotate the plane of polarization by 90° is called the half-wave voltage. The half-wave voltage of lithium tantalate and lithium niobate is 2.2 kilovolts. Therefore, in principle, a light modulation of 100 percent may be performed by applying an operating voltage equivalent to a half-wave voltage of 1.1 kilovolts to the electrodes of the layer body. Preferably, the operating voltage is kept lower to facilitate handling. For this reason, the thin plate is usually made several hundred microns thick. The light switches 4 may be made a high speed information display plate by rapidly controlling the light modulator 8 from the outside.

The high speed information display plate of FIGS. 4a and 4b may be utilized to provide a rewritable holographic memory, as explained with reference to FIG. 5. A medium for a rewritable holographic memory of thermowriting type such as, for example, an MnBi thin film, is well known, and such medium becomes a two dimensional type storage or information memory plate. When the light is reproduced, a two dimensional type hologram reproduces a real image and a virtual image without the inversion of the surface on which the hologram has been produced. In the present example, the two dimensional type rewritable hologram is utilized as a storage plate or information memory plate 12.

In FIG. 5, a laser beam from a laser source 13a is split into the reference beam L1 and the body beam L2 by a writing and reading light switch 13b. The body beam of light L2 passes through a polarizer 14. The reference beam of light L1 passes through a light deflector 15. The light passing through the polarizer 14 is reflected by a reflector 16 and is magnified by a lens 17. A collimator lens 18 produces from the magnified light a coherent body beam of light L2 of parallel plane waves.

A high speed information display plate of the type shown in FIGS. 4a and 4b is utilized as a high speed information display plate 19. In producing the hologram at the storage plate 12, the writing and reading light switch 13b, the light deflector 15, the polarizer 14 and an information plate control 20 are controlled by a control system or unit 21. The body beam of light L2, which is a diffused light of specific information or data, is irradiated on the surface of the hologram. Simultaneously, the coherent reference beam of light L1 is irradiated at a specific position on the surface of the hologram. Thus, a hologram of an area equal to that occupied by the reference beam of light L1 is produced. The small hologram is called a page hologram.

A large output coherent light source such as, for example, a YAG pulse laser is utilized as the light source. In the reconstruction of the hologram, that is, the reading out of the memorized or recorded information, the distribution of light from the writing and reading light switch 13b to the polarizer 14 is interrupted, and only the reproducing light is transmitted to the deflector 15. This permits the reconstruction of the hologram. Random access is provided in the light deflector 15. The image of the reproduced real focus group is detected by the light detecting system 22.

In the invention, as hereinbefore described, since the information source provides diffusion, the diffusion plate and the large convex lens for effecting Fourier transformation, utilized in the known apparatus, may be eliminated. Since the reproduced image is the focal image, binary informations or data may be detected with facility and the image of the diffusion plate does not appear as the background of the reproduced image. Informations or data may be detected at a very high signal to noise ratio. Furthermore, the utilization of light switches in the apparatus of the invention permits high speed switching of image informations, and the apparatus of the invention may be utilized to considerable advantage with an electronic computer, since said apparatus may rapidly switch image informations and also display binary informations or data.

While the invention has been described by means of specific examples and in specific embodiments, I do not wish to be limited thereto, for obvious modifications will occur to those skilled in the art without departing from the spirit and scope of the invention.

I claim:

1. A method of producing holograms, comprising the steps of irradiating a coherent beam of light onto a plurality of short focus convex lenses constituting an image information; diffusing the coherent beam of light by the convex lenses; directing the diffused light to a storage plate located a considerable distance further away from the convex lenses than the foci of the convex lenses so that the diffused light from all the convex lenses irradiates the storage plate; and irradiating the storage plate with a reference beam of light so as to cause the reference beam to interfere with the diffused beam of light.

2. A method of producing holograms as claimed in claim 1, wherein the image information is constituted by the intensity ratio of the coherent beams of light passing through the convex lenses.

3. A method of producing holograms as claimed in claim 1, which comprises varying the image information by controlling the magnitude of light irradiating the convex lenses.

4. Apparatus for producing holograms, comprising light means for providing a coherent body beam of light and a reference beam of light; an information source comprising a plurality of coplanarly positioned short convex lenses for diffusing the coherent beam of light; a plurality of light switches in front of the convex lenses for controlling the coherent beam of light irradiating the convex lenses; control means for controlling the operation of the light switches to constitute the image information; and a storage plate behind the information source at a position in which it receives the diffused light from all the convex lenses, said storage plate being located a considerable distance further away from the convex lenses than the foci of the convex lenses.

5. Apparatus for producing holograms as claimed in claim 4, wherein the storage plate comprises a photographic dry plate.

6. Apparatus for producing holograms as claimed in claim 4, wherein the storage plate comprises a storage medium on which holograms may be produced and from which holograms may be erased.

7. Apparatus for producing holograms as claimed in claim 4, wherein the light means comprises a laser source for providing a polarized coherent beam of light, and a polarizing plate positioned in front of the convex lenses.

* * * * *